Figure 3:
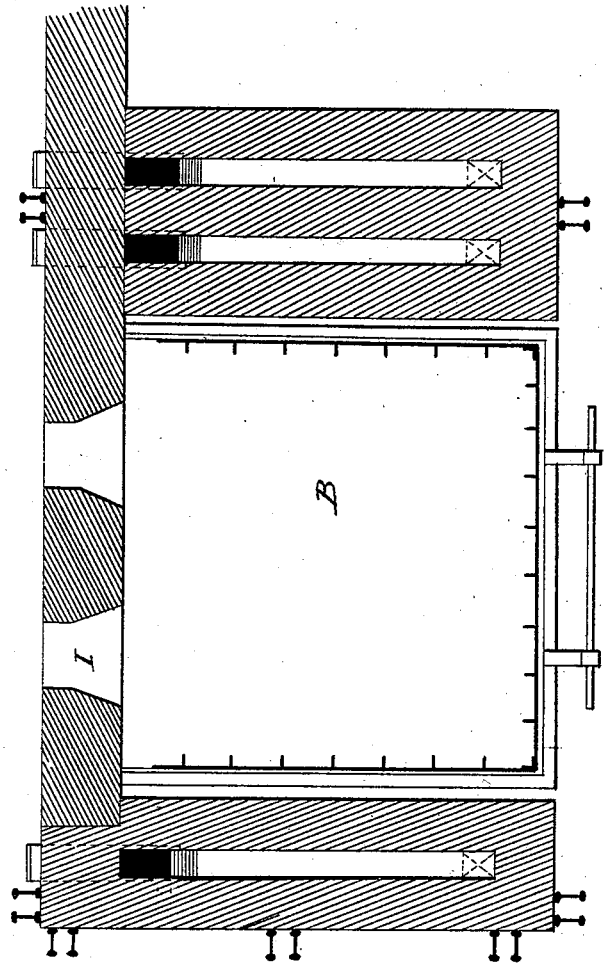

3 Sheets—Sheet 1.
F. SIEMENS.
Furnace for Annealing and Tempering Glass.
No. 226,934. Patented April 27, 1880.
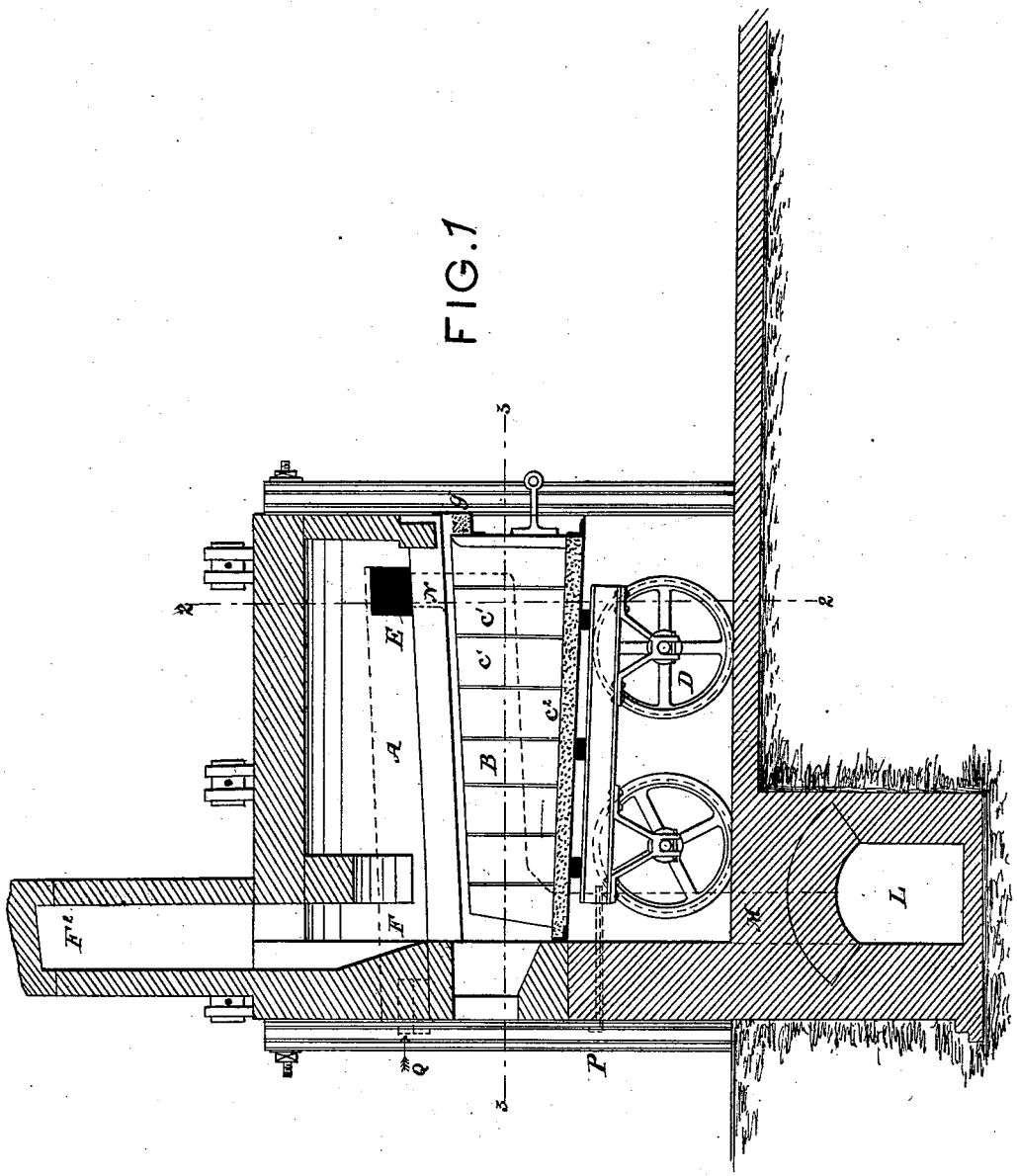

3 Sheets—Sheet 2.

F. SIEMENS.
Furnace for Annealing and Tempering Glass.

No. 226,934.                    Patented April 27, 1880.

Witnesses
Wm H. Bates.
N. B. Whitman.

Frederick Siemens Inventor
by
Charles S. Whitman Atty

3 Sheets—Sheet 3.

F. SIEMENS.
Furnace for Annealing and Tempering Glass.

No. 226,934. Patented April 27, 1880.

Witnesses
Wm H. Bates
N. B. Whitman

Fredrick Siemens Inventor
by
Charles S. Whitman
Att'y

UNITED STATES PATENT OFFICE.

FREDERICK SIEMENS, OF DRESDEN, GERMANY.

FURNACE FOR ANNEALING AND TEMPERING GLASS.

SPECIFICATION forming part of Letters Patent No. 226,934, dated April 27, 1880.

Application filed February 3, 1880.

*To all whom it may concern:*

Be it known that I, FREDERICK SIEMENS, of Dresden, in the German Empire, have invented certain Improvements in Furnaces for Annealing and Tempering Glass, of which the following is a specification.

The following description, taken in connection with the accompanying plate of drawings, hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

Heretofore glassware has been annealed by heating it up to a red or white heat in a closed oven and then allowing it to cool gradually. It has also been proposed to anneal small glass vessels immediately after their completion and while they are yet hot by placing them in a close compartment or box and keeping them thus confined until they have become cool. It has also been proposed to anneal glass by placing it in open boxes, which are run into and out of the kiln.

According to my invention the glassware is placed on a traveling or removable floor, which may be wheeled into position so as to form the bed of the kiln and be exposed to the direct action of a gas-flame. The traveling chamber or bed for this purpose is in the form of a truck open at the top and at one end for the introduction of the glassware through apertures in the stove. The truck is made of metal, and its sides may have ribs projecting inward to prevent the glass from coming into direct contact with the outer casing. The sides of the truck have at their upper edges sand-troughs to receive projecting lips on flanges of a hood.

The truck, uncovered, is wheeled into the gas-stove, where it is heated to redness. The glass articles, as they are made, are introduced into the heated truck through the openings in the wall of the stove, and when the truck is filled and sufficiently heated it is wheeled out of the stove, and a hood or cover is immediately placed upon it, the flanges or lips of the hood being immersed in the sand-troughs to prevent access of air. The truck thus covered is wheeled away to a convenient place, where it is allowed to cool gradually, and after cooling its contents are removed.

By providing a pair of kilns and several trucks with lids and hoods, as described, the work can be carried on continuously, the heating, charging, cooling, and discharging of each being performed in rotation.

Glassware treated as described can, if desired, be heated to a higher degree than in ordinary annealing-kilns, and, owing to this circumstance and to the comparatively rapid but regular cooling, it receives a certain temper, whereby its strength and power to resist blows are considerably increased.

My invention therefore consists in a process of removing the brittleness of glass vessels after their manufacture and increasing the power of glass articles to resist fracture on impact by charging the glass upon the movable floor of a kiln while under the influence of a gas-flame and then covering and removing the floor to a cooling-atmosphere.

It also consists in the provision of means whereby the direct contact of the glassware with the exterior casing of the movable floor is prevented.

My invention also relates to improvements in the construction of the kiln in which my new process of annealing and tempering glass is conducted, whereby the removable floor for the reception of the glass articles to be annealed or tempered may be readily detached and removed from the fixed part of the heating-chamber.

Another feature of the invention consists in certain appliances whereby close joints between the fixed heating-chamber and movable floor are formed and the access of cold air to the movable floor of the kiln prevented.

In the accompanying drawings, in which corresponding parts are designated by similar letters, Figure 1 shows a longitudinal section, taken in vertical planes on the line 1 1, Fig. 2, of a kiln adapted to my process of annealing and tempering glass. Fig. 2 shows a transverse vertical section of the same, taken on the line 2 2, Fig. 1. Fig. 3 shows a horizontal section of the same, taken on the line 3 3, Fig. 1.

The kiln or stove is composed of the fixed brick-work heating-chamber A and the removable bed B, in which the glass articles to be annealed are placed. This bed or chamber is composed of sheet metal, and the sides thereof are provided with internal ribs, C, the function of which is to prevent the glass articles from coming into direct contact with the outer casing of the said chamber. The bottom of the said chamber is provided with a lining of sand or any other suitable non-conducting material.

The bed of the kiln may be readily detached and removed from the stationary part thereof by means of the wheels D, upon which the former is mounted, running on rails. The said removable chamber is open at the top and at the inner end, so that when forming the bed of the kiln the flames or hot gases issuing from the ports E on either side can play freely into and over the whole surface of the floor before escaping through the opening F to the chimney F². When the chamber is in position as the bed or bottom of the kiln, a close joint is formed between it and the stationary part of the structure by means of sand-troughs g on the sides of the said chamber, into which dip the flanges h, fixed to the brick-work of the kiln. When in this position the interior of the said chamber is heated to the required temperature by the flame or hot gases, and the glass articles to be annealed are introduced into it through doorways I in the back wall of the kiln. These articles may be packed in tiers in the chamber when they are of such a character and form as to admit of it, care being taken that they do not come in contact with the outer skin.

When a truck has been filled and the glass articles subjected to the heat of the stove for a sufficient length of time, it is withdrawn, and its open end and top are immediately closed by a hood or cover suspended close in front of the kiln, the flanges of which hood dip into the troughs g, so as to form a close joint. The said chamber thus closed by the cover is then run upon the track to any convenient locality, where its contents are allowed to cool. The hood K is then removed, and after the glass has been taken out the truck is again ready for use.

The combustible gas for heating the kiln passes from the main channel L, leading from a gas-regenerator up through the flues M to the openings N, where it meets the air entering through passages O. Slides P and Q are provided for regulating the supply of gas and air to the kiln or cutting it off when a chamber is moved.

The space beneath the truck B being quite open to the atmosphere, the under framing and wheels are kept sufficiently cool to prevent injury.

Two kilns similar to those above described may be arranged side by side, so that while the removable chamber in one is receiving glass articles to be annealed a filled chamber may be removed from the other and an empty chamber may be introduced and heated preparatory to receiving a charge. In this manner the annealing and tempering of glass can be carried on continuously, and a large quantity may be annealed and tempered by means of a pair of comparatively small kilns. Sets of three or more kilns can likewise be worked in rotation.

I claim—

1. The improvement in the art of annealing glass by charging it upon a movable floor of a kiln while under the influence of a gas flame and removing it in or on the closed floor of the kiln into a cooling atmosphere.

2. The improvement in the art of annealing glass by preventing the direct contact of the glassware with the exterior casing of the movable floor, as and for the purposes described.

3. A kiln for annealing glass, consisting partly of a fixed heating-chamber and partly of a removable floor, as and for the purposes described.

4. The sand-trough on the sides of the removable floor, capable of being combined either with the flange attached to the brick-work of the kiln or the flanges attached to the hood, as and for the purposes described.

5. The improvement in the art of annealing glass consisting in the arrangement of annealing-kilns having removable floors in sets of two or more, so that they may be used in succession for receiving continuously the glass articles to be annealed, as and for the purposes described.

In testimony that I claim the foregoing I have hereunto set my hand this 10th day of January, 1880.

FREDERICK SIEMENS.

Witnesses:
 LÉON KLEMPERER,
 PAUL DRUCKMÜLLER.